United States Patent [19]

Brown et al.

[11] 4,067,106

[45] Jan. 10, 1978

[54] APPARATUS FOR PLACING INSULATORS

[75] Inventors: Ronald H. Brown, Hamilton; Richard W. Bale, Fennville, both of Mich.

[73] Assignee: General Electric Company, Fort Wayne, Ind.

[21] Appl. No.: 704,677

[22] Filed: July 12, 1976

[51] Int. Cl.$^2$ .......................................... H02K 15/10
[52] U.S. Cl. ..................................... 29/734; 29/527.4
[58] Field of Search ............. 29/205 E, 205 D, 527.2, 29/527.4 X, 193, 283, 734, 736

[56] References Cited

U.S. PATENT DOCUMENTS

| 3,324,536 | 6/1967 | Hill | 29/205 D |
|---|---|---|---|
| 3,579,818 | 5/1971 | Arnold | 29/59.6 |
| 3,694,887 | 10/1972 | Walker et al. | 29/205 E |
| 3,698,063 | 10/1972 | Smith | 29/205 R |
| 3,748,714 | 7/1973 | Kieffer | 29/606 X |
| 3,805,357 | 4/1974 | Peters | 29/205 E |
| 3,829,953 | 8/1974 | Lauer et al. | 29/205 E |
| 3,831,255 | 8/1974 | Smith et al. | 29/205 E |

OTHER PUBLICATIONS

"Answers to Your Question About Nituff®", Nimet Industries, Inc., 1969.
"Modern Metals", Magazine, pp. 46-47, May, 1976.
"Metal Finishing Guide Book and Directory", pp. 493-495, 1975.

Primary Examiner—Carl E. Hall
Attorney, Agent, or Firm—Ralph E. Krisher, Jr.

[57] ABSTRACT

Pushers or push rods for insulator and/or insulator and winding placing apparatus are manufactured by selecting an aluminum based alloy and extruding it to establish a length of material having an extruded cross-sectional configuration approximately corresponding to any cross-sectional configuration desired for an insulator pusher. Thereafter, a final desired length of insulating pushers is established, e.g., by cutting and finish milling sections of the extrusion to a desired finished length. Thereafter, the wedge pushing or leading end of the insulator pusher is machined when it is to have a shape other than the raw extrusion shape; and a trailing portion of the pusher is also machined so that it will interfit with a pusher drive mechanism. The extruded member is then treated to remove any sharp edges, burrs, or foreign matter occlusions in the extruded stock (e.g., by passing it over a nylon textured wheel). At least those portions of the wedge that are subjected to sliding wear during use are hard coat anodized and also treated to improve the hardness and lubricity thereof. The corundum (or alpha aluminum) that forms the anodized aluminum surface is relatively porous, hard, somewhat brittle, and not characterized by particularly good lubricity characteristics. After being surface treated, the insulator pushers are assembled into any desired piece of equipment that makes use of such parts.

4 Claims, 12 Drawing Figures

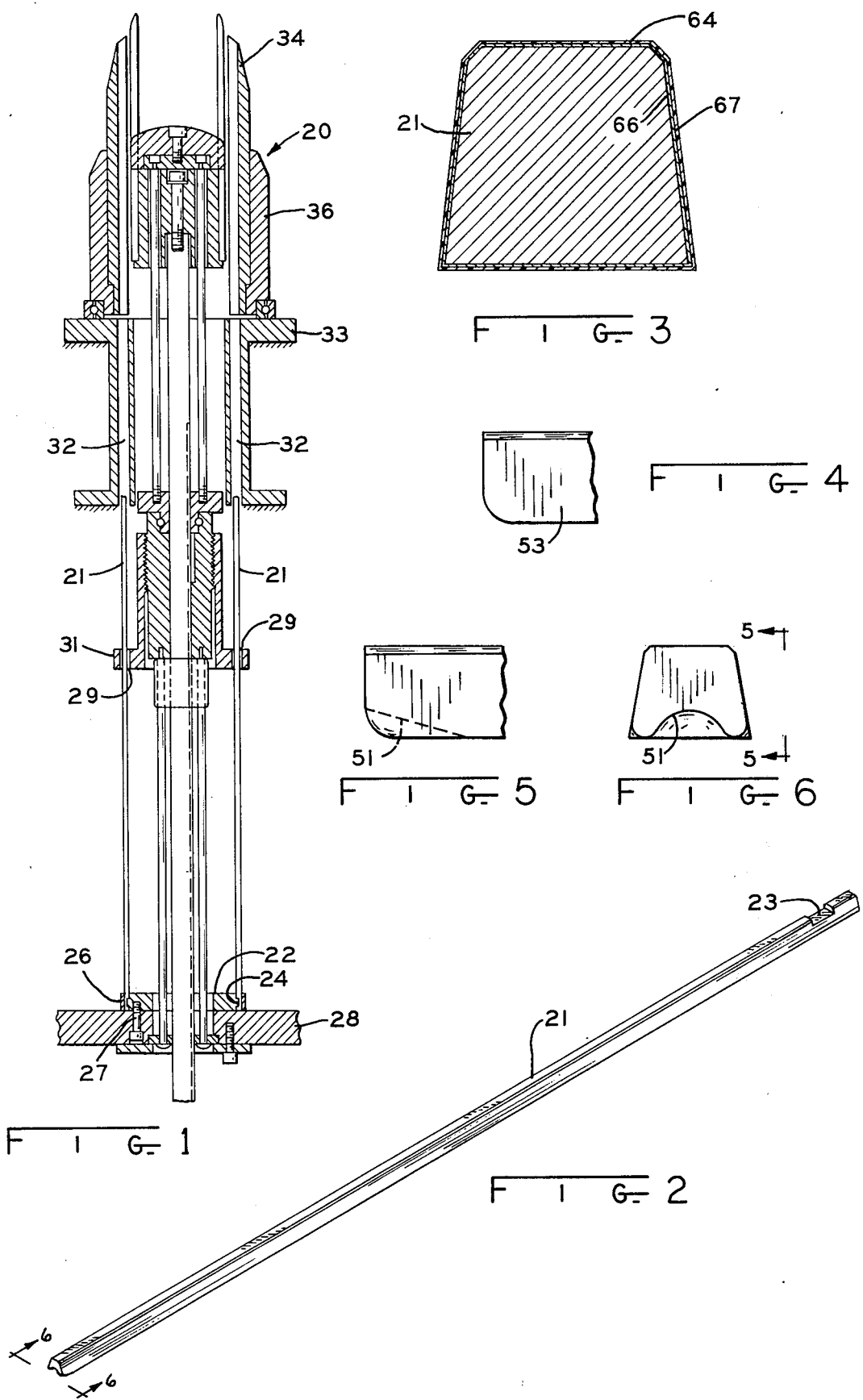

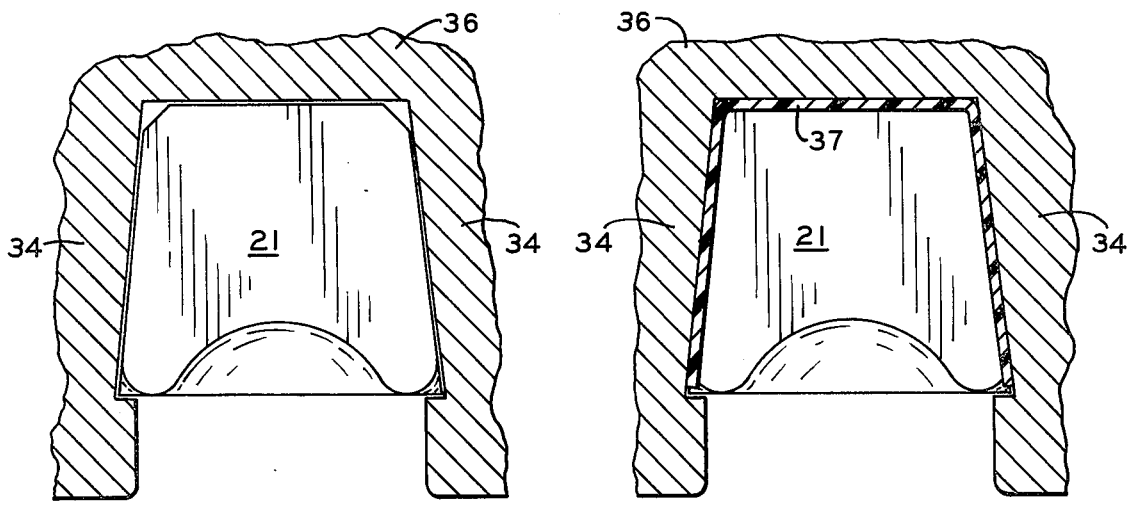
FIG. 7
FIG. 8
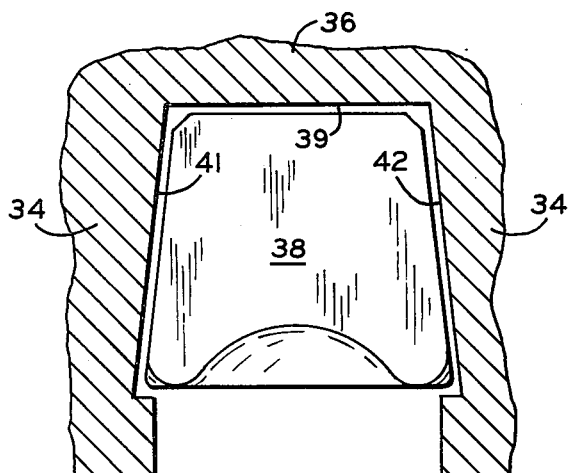
FIG. 10
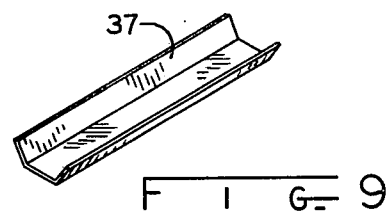
FIG. 9
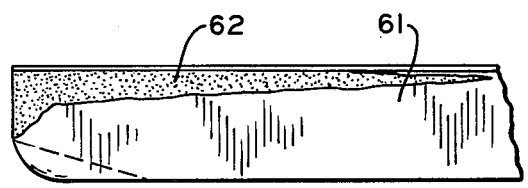
FIG. 12
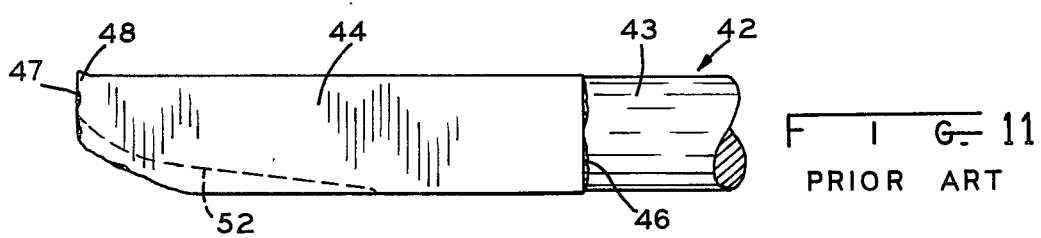
FIG. 11 PRIOR ART

APPARATUS FOR PLACING INSULATORS

BACKGROUND OF THE INVENTION

The present invention relates geneally to apparatus for placing insulators in magnetic core slots, whether such apparatus is of a type that is utilized primarily for inserting only insulators into the slots of a core, and/or of a type that may be used for inserting both insulators and side turn portions of windings into such slots.

There are numerous patents in the art which illustrate apparatus that may be used for placing both side turn portions of coils and insulators into slots of a magnetic core. For example, Smith et al U.S. Pat. No. 3,831,255 of Aug. 27, 1974; Lauer et al. U.S. Pat. No. 3,829,953 of Aug. 20, 1974; Smith U.S. Pat. No. 3,698,063 of Oct. 17, 1972; Arnold et al U.S. Pat. No. 3,579,818 of May 25, 1971; Hill U.S. Pat. No. 3,324,536 of June 13, 1967; and Kieffer U.S. Pat. No. 3,748,714 of July 31, 1973, all show and describe apparatus that may be utilized for this purpose. The specific location of insulators (also sometimes called wedges) in slots relative to coil side turn portions are well illustrated, for example, in Hill et al. U.S. Pat. No. 3,694,887 of Oct. 3, 1972. As best revealed in this last reference Hill et al. patent, insulation pieces in a magnetic core may typically include ground insulation (also called cell insulators); insulators that separate the side turn portions of two different winding phases; and slot closure insulators (or wedges) which lie along axially extending core slot openings adjacent the core defined by the core.

Other equipment is utilized simply for placing between phase or slot closure insulators (both of which are sometimes called wedges) in core slots. One patent that describes wedge placing alone is Peters U.S. Pat. No. 3,805,357 which issued Apr. 23, 1974. Still another approach that may be utilized when placing only insulators is taught in co-pending application Ser. No. 666,143 which was filed Mar. 11, 1976 in the name of Alan L. Kindig and Ronald H. Brown, and which application is assigned to the same assignee as the present application.

A brief review of the above-reference patents will quickly reveal that elongate members (variously called wedge pushers, pusher rods, wedge push rods, and so forth) are utilized in many of the known types of insulator placing equipment. In many of these, the insulator pushers are guided along pathways in which elongate insulator pieces are retained. The leading end of the insulator pushers engage the trailing end of the insulators and then advance the insulators axially into and along slots of a magnetic core (e.g., a dynamoelectric machine stator or rotor core).

In some of the above-referenced patents (for example, see Smith et al U.S. Pat. No. 3,831,255 or Arnold U.S. Pat. 3,579,818) elongate pushers transfer insulators downwardly into a wedge guide housing. Subsequently, other elongate pushers advance the same insulators from the wedge guide housing upwardly and axially into and along the slots of magnetic cores.

Known insulator pushers are designed so that at least the leading ends thereof are configured to have a relatively close sliding tolerance (e.g., a tolerance of about 0.003 of an inch or 0.076 mm) with passages along the wedge guide housing (or other wedge guiding structure) along which the insulators are moved. Satisfactory operation of the apparatus requires that this relatively close dimensional tolerance be maintained, because the insulators are typically formed of thin sheet material which may be only 0.014 inches (0.356 mm) thick and if the trailing portions thereof slip between the insulator guiding walls and the leading ends of the insulator pushers; the insulators will become wedged therebetween and jam the machine.

A review of the above-referenced patents (all of which are incorporated herein by reference for background information) will reveal that much of the equipment in which elongate insulator push rods are utilized is relatively complex. Moreover, jamming of one or more insulator pushers could damage other parts of the equipment, and thus be costly to repair (in terms of material, machined parts, and time). In some equipment with which we are familiar, the pushers are made of about three-sixteenths inch round music wire and have machined brass tip silver soldered to the leading end thereof. This approach leads to wear of the pusher tips but not the wedge guide surfaces; but these pushers can cost as much as $27 each.

Elongate insulator pushers (or at least parts thereof) often are formed of a material that will wear away during normal usage, or yield in the event that the mechanism becomes jammed. Then, in the event a malfunction of the equipment occurs, the insulator pushers themselves are replaced and, hopefully, the insulator guide members will not have been excessively damaged.

The above-reference patents also reveal that a relatively large number of insulator pushers are utilized in any given piece of equipment. In many cases, a number of pushers will be provided that equal the number of slots of the core that is to be placed on the machine. Thus, it is common practice to provide 24, 36, (or more) pushers in each piece of equipment.

When the pushers are manufactured by machining the trailing end of a length of music wire (so that the trailing end thereof can be mounted into the insulator placing equipment), and silver soldering a brass pusher head thereto; the pushers themselves are expensive and a substantial amount of labor expense is involved in removing broken or damaged insulator pushers and then re-assembling the equipment with a replacement insulator pusher.

In equipment with which we are familiar and wherein bronze tipped pushers are used, we have observed that failure of a pusher is usually associated with an insulator (or wedge) being "dropped"—i.e., trapped between the pusher tip and a wedge guide wall. When this occurs, the silver solder joint between the music wire push rod and bronze tip often fails when the machine attempts to return the pushers to their rest position. It then becomes necessary to spend a considerable amount of time in removing the jammed bronze tip from the apparatus, as well as the music wire pusher. We have found that the actual machine down time associated with a failure of this type may be as much as 3 hours.

Another prior approach has been to make pushers from rectangular drill rod stock which is machined to have the desired contours and shapes. The problem with this approach is that pushers made in this manner can cost as much or more than pushers made according to the music wire bronze tip approach. Moreover, failure of a machined drill rod (or other steel) pusher can result in damage to adjoining pushers, or to the wedge guide housing itself. In that event, three or more pushers may have to be replaced because of the failure of a single pusher. Yet another problem associated with the approach just described is the substantial machining and grinding operations that must be performed in order to manufacture a pusher of the overall desired shape and contour; and it is again emphasized that this is in addition to the possibility of galling and other damage to the wedge guide housing that might occur at the time of pusher failure.

We have now devised a new and improved insulator pusher, method of making the same, and method of making equipment utilizing the same so that our new and improved insulator pushers should cost only about one-tenth as much as those of the prior art. Surprisingly, when failure does occur, machine down time is reduced to only 1 and ½ hours because the new and improved pushers are much easier to remove and replace. In addition, failure of a pusher is now much less likely to cause damage to any other part of the machine. It is also surprising that we have now determined that use of our invention results in much less frequent pusher malfunctions and thus leads to less overall insulator pusher damage and breakage.

Accordingly, one general object of the present invention is to provide improved insulator pushers which are less susceptible to damage and wear in practice than insulator pushers of the prior art.

It is another object of the present invention to provide new and improved insulator pushers which, when jammed in a piece of equipment, are relatively easy to remove therefrom.

SUMMARY OF THE INVENTION

In carrying out the present invention is one preferred form thereof, we manufacture pushers or push rods for apparatus of the type mentioned hereinabove by selecting an aluminum based alloy and extruding it to establish a length of material having an extruded cross-sectional configuration approximately corresponding to any cross-sectional configuration desired for an insulator pusher. Thereafter, we establish a final desired length of the insulating pusher (e.g., by cutting and finish milling) sections of the extrusion to a desired finished length. Thereafter, we machine the wedge pushing or leading end of the insulator pusher when it is to have a shape other than the raw extrusion shape; and also machine a trailing portion of the pusher so that it will interfit with a pusher drive mechanism. It then is preferable to treat the extruded member to remove any sharp edges, burrs, or foreign matter occlusions in the extruded stock (e.g., by passing it over a nylon textured wheel). As a final step, we hard coat anodize at least those portions of the wedge that are subjected to sliding wear during use.

The corundum (or alpha aluminum) that forms an anodized aluminum surface is relatively porous, hard, somewhat brittle, and not characterized by particularly good lubricity characteristics. Accordingly, we treat the anodized parts in order to increase the lubricity thereof (i.e., reduce the frictional characteristics). Any number of known treatment may be used, but it is most convenient to send the aluminum parts to any one of several well known companies that specialize in impregnating aluminum anodized surfaces with a high lubricity material (e.g., Teflon material of the E.I. DuPont de Nemours and Company).

After being treated as described, the insulator pushers are assembled into any desired piece of equipment that makes use of such parts. Our preferred process includes placing insulator pushers as just described in new equipment and, also, placing such pushers as replacement parts in existing equipment.

The subject matter which we regard as our invention is particularly pointed out and distinctly claimed in the concluding portion of this specification. The invention itself, however, along with further objects and advantages thereof, may be best understood by reference to the following description taken in conjunction with the accompanying drawings.

BRIEF DESCRIPTION OF THE DRAWINGS

FIG. 1 is a somewhat simplified elevational view of an apparatus for inserting insulators and coil side turn portions into the slots of a magnetic core, said apparatus embodying our invention in one form thereof;

FIG. 2 is a perspective view of one of the insulator pushers utilized in the apparatus of FIG. 1;

FIG. 3 is an enlarged scale view of a transverse section of the insulator pusher of FIG. 2;

FIG. 4 is an enlarged scale side view of the tip of a modified insulator pusher that otherwise corresponds to the pusher of FIG. 2;

FIG. 5 is an enlarged scale side elevation of the leading end of the insulator pusher of FIG. 2;

FIG. 6 is an end elevation of the insulator pusher tip of FIG. 5;

FIG. 7 is a cross-sectional view showing the relationship of the insulator pusher of FIG. 2 with part of a wedge guide trackway of the apparatus of FIG. 1;

FIG. 8 is a view similar to FIG. 7 except that an insulator has been shown in position above the leading end of the insulator pusher;

FIG. 9 is a perspective view of the insulator that is shown in FIG. 8;

FIG. 10 is a view similar to FIG. 7 except that an insulator has been shown in an exaggerated worn condition such that an insulator would likely jam between the illustrated pusher and the wedge guiding surfaces;

FIG. 11 is a side elevational view of a portion of an insulator pusher made in accordance with prior practices; and FIG. 12 is a side elevation of a "raw aluminum" extruded insulator pusher that was tested and failed after being utilized in only a relatively few injection cycles.

DESCRIPTION OF THE PREFERRED EMBODIMENTS

Referring now to the drawings, and more particularly to FIG. 1; we have illustrated an apparatus 20 which is very similar in illustration to the apparatus shown in FIG. 17 of the above-referenced Lauer et al. U.S. Pat. No. 3,829,953.

Magnetic cores, coils and insulators are not shown in FIG. 1 for simplicity of illustration, but it will not be understood that the apparatus 20 is usable as described in the Lauer et al patent and described in considerable detail therein. Accordingly, a description thereof in corresponding detail is not repeated herein. It is noted that the apparatus 20 includes a plurality of insulator pushers 21 which are carried on a disc-like base 22. Notches 23 (see FIG. 2) in the pushers 21 interfit with a tongue or projection 24 on the base 21, and a conventional clamp ring 26 holds the pushers 21 to this base. The base 22 in turn is fastened by means of a plurality of screws 27 to a platen 28 which moves upwardly and downwardly during each machine cycle. It will be observed from FIG. 1 that the pushers 21 extend through openings 29 in a control member 31 and also extend to the bottom of insulator guide apertures 32. The insulator guide apertures 32 are formed in a support 33 which may form part of the machine frame or base.

Located above the insulator guide apertures 32 are insulator pathways defined by adjacent insulator guides 34 that are carried by a cylindrical housing 36. The pusher 21 is extruded from a readily available aluminum alloy such as alloy 6061 T6 or 6063 T6 so that it will have any desired cross-sectional configuration.

With reference for the moment to FIG. 7, it will be appreciated that the overall cross-sectional configuration of at least the leading end of the pusher 21 should generally conform to the configuration of the insulator guide paths established by those parts along which the insulators are to move, such as the insulator guides 34 and the housing 36. The insulators themselves may be of somewhat different shapes and configurations for different applications, so the insulator 37 of FIG. 9 is shown only for purposes of discussion. It is preferred that the final overall dimensions of the pusher 21 be such that not more than about 0.005 of an inch (0.127 mm) clearance be established between an insulator guide (or housing) and a pusher 21 when it is deflected as far as possible away from either an insulator guide 34 or the housing 36. This amount of clearance is predicted on use of an insulator 37 formed from a material having a thickness of about 0.0014 of an inch (0.356mm). The insulator may (as will be understood by persons skilled in the motor art) be formed of an insulating paper or a material such as MYLAR as marketed by the E.I. DuPont de Nemours and Company.

FIG. 8 illustrates an insulator 37 positioned over the pusher 21 to indicate the relative positioning thereof with respect to the insulator guiding walls established by the housing 36 and the guides 34. If a pusher were utilized which had too great a clearance relative to the walls established by the guides 34 and housing 36, the insulator 30 might slip therebetween and become wedged during a machine cycle.

Problems of wedge pusher failure have occurred when a pusher (such as the pusher 38 of FIG. 10) has become so worn that a sufficient clearance would exist between the pusher and a guide 34 or the housing 36 that an insulator could slip between a wall 39, 41, or 42 (see FIG. 10) and the pusher. Then, as the pusher advanced, the insulator 37 would become tightly wedged between the pusher and one of the insulator guiding walls. This could, as will be understood, result in buckling of a pusher if it had insufficient columnar strength. On the other hand, depending on the time within a machine cycle when such jamming occurred, retraction of the platen 28 in a direction to retract the pusher 38 could apply sufficient tensile stress to break silver soldered joints in a composite pusher.

FIG. 11 illustrates a prior art pusher 42 that is made of a piano wire push rod 43 and a bronze tip 44 that has been silver soldered at 46 to the rod 43. The pusher 42 has been drawn to represent, as accurately as possible, the shape and configuration of a pusher that has failed in a machine such as the machine 20. It will be noted that the lead end 47 of the pusher is battered and deformed as indicated for example at 48. Moreover, galling and nicks were evident on the pusher which could damage the enamel coating on the magnet wire along which the pusher tip 44 must slide during an insertion procedure.

Turning now to FIGS. 5 and 6, it will be noted that a lead end tapered groove 51 is provided. This groove is provided for the same reason as the lead end groove 52 in the pusher 42 of FIG. 11 (i.e., to accommodate winding turns during an insulator inserting step). Alternatively, the leading tip of the pusher 21 could be configured to appear as shown at 53 in FIG. 4 with no lead end groove. It thus should be understood that the particular configuration of the leading tip or end of an insulator pusher embodying the invention will depend upon the needs of a given application, and that the pushers may be contoured or shaped to have any desired final shape.

In the manufacture of pusher 21, we extrude aluminum to establish an elongate rod having a configuration generally as indicated in FIG. 3. Thereafter, we mill notch 23 at the trailing end thereof, and use a ball nosed end mill to establish the desired shape of the leading end of the pusher as shown in FIGS. 5 and 6. If a raw aluminum pusher is then utilized in apparatus such as apparatus 20 without further treatment, it will quickly fail.

FIG. 12 represents a pusher 61 which was manufactured as described above but which received no special surface treatment. The pusher 61 failed after only 335 injection cycles of an apparatus similar to the apparatus 20. Failure of the pusher 61 occurred because a wedge slipped or "dropped" between the wedge guiding walls of the apparatus and the exterior faces of the pusher 61. Close examination of the pusher 61 revealed that the edges of the leading tip of the pusher 61 had become rounded. Moreover, observeable wear had occurred in the leading end of the pusher denoted by the stippled area 62 in FIG. 12.

However, pushers such as the pusher 21 which revealed a preferred form of surface treatment have been tested in over 35,000 machine cycles without failure. In fact, a pusher that was examined after about 35,000 cycles appeared, upon visual examination, to be in the same condition then as when it was new. The surface treatments that we provide are not believed to provide any significant improvement in columnar strength of the pushers. Rather, the preferred treatments that we provide on the pushers 21 result in improved surface hardness and wear characteristics. Moreover, it is preferred to improve the lubricity of the hardened surfaces and thus reduce the sliding resistance of the pushers along the apparatus 20 during each machine cycle. The improved hardness, it is believed, is what provides a greater resistance against rounding of the corners of the pusher in the area of contact between the pusher and an insulator. In preferred forms, we treat the pushers 21 by hard coat anodizing at least those parts of the pusher subjected to wear. Generally, it is the most economical to anodize the entire pusher and thus form an anodized skin 64 therearound as represented in FIG. 3. As will be understood by persons skilled in the art, conventional anodizing procedures result in some penetration of the original aluminum material and this penetration of the original aluminum material is represented by the anodized layer 66. In addition, the part will "grow" during the anodizing process and the "growth" layer is represented by the numeral 67. Hard coat anodizing is a well known process and further details thereof will not be included here. It is noted for those less skilled, however, that processes such as those described in the *Metal Finishing Guidebook & Directory*, 43rd Annual Edition (1975), by Metals and Plastics Publications, Inc., One University Plaza, Hackensack, N.J., 07601, may be followed.

For example, the aluminum pusher will be made the anode in a sulphuric acid bath having an acid concentration of 5 to 10 percent by weight, after which 14–18 volts are applied across the bath between the cathode and anode. Alternatively, chromic acid may be utilized rather than sulphuric acid. This anodizing process, all as is well known, forms a layer of alpha aluminum (also referred to as corundum) on the exposed surfaces of the aluminum. This layer of anodized material is quite hard but also brittle and porous. As a further treatment step, the lubricity characteristics of the anodized surfaces subject to wear is improved. One way of improving this characteristic would be to apply known anti-friction materials; e.g., of the molybdenum disulfite or of the silicone or fluorohalocarbon type to the anodized surface. One such fluorohalocarbon material is (as is well known) tetrafluoroethylene, sometimes calls "TFE, " and commonly sold as "TEFLON" material by Du-Pont.

We thus treat the anodized pusher (or at least those parts that will be subjected to sliding friction) in order to reduce the friction characteristics thereof. This may be done, for example, by wiping or otherwise applying a material such as "TEFLON S" resin (which is a liquid dispersion of Teflon particles sold by DuPont) to the anodized surface of pusher 21, and then curing the material to provide a hard, abrasion-resistant surface with relatively good lubricity characteristics.

It is even more preferred, however, to send the extruded and machined "raw aluminum" extruded pieces to one of the known companies that specialize in impregnating a material, such as TEFLON, into anodized aluminum surfaces. Such companies include Advance Technology Conklin of Chicopee, Minn, which will TEFLON impregnate anodized aluminum parts (or both anodize and impregnate) by their process called "IMPREGLON"; the "Modern Materials" company of P.O. Box 218, Rochester, Ind., 46975, which will perform the service just mentioned, also by their process called "IMPREGLON"; the General Magna Plate Corporation of Linden, N.J. which will apply a TEFLON impregnated anodized coating called "TUFRAM" by them; and NIMET Industries, Inc. of 925 South Webster St., South Bend, Ind. 46621, which anodizes and impregnates to provide what that company calls a "NI-TUFF" coating. In these processes, the anodized aluminum surface layer is penetrated by the TEFLON material to achieve a self-lubricating surface with low friction characteristics and high lubricity.

Surprisingly, we have determined that even if insulator pushers made in accordance with our preferred mode are wedged by an insulator in an insulating placing machine and become stuck, they are easily withdrawn from the equipment (for example with a pair of pliers). On the other hand, brass or steel parts tend to gall and become tightly stuck in the equipment with the result that maintenance personnel often must resort to the use of punches and hacksaws in order to sever and remove the pushers from the equipment.

Another surprising characteristic which we have observed is that insulator jams involving pushers manufactured as taught herein most usually result in crumpled insulators rather than "dropped" and wedged insulators. For example, improper operator operation may result in an attempt to place insulators in slots that are already filled with wire. With prior art pushers, such misoperation often would cause one or more insulators to become tightly wedged between a guide wall and a pusher, with the resulting severe maintenance problems mentioned hereinabove. However, when equipment is provided with new and improved pushers as described herein and such misoperation occurs, only crumpled insulators usually result, and such crumpled insulators are easily removed from the machine.

While we have shown and described different embodiments of the invention, it should now be obvious to those skilled in the art that changes and modifications may be made without departing from the invention itself. It is therefore intended in the appended claims to cover all such changes and modifications that fall within the true spirit and scope of our invention.

What we claim as new and desire to secure by Letters Patent of the U.S. is:

1. In apparatus for placing at least insulators in the slots of magnetic cores wherein said apparatus comprises a plurality of insulator guide walls; a plurality of elongate insulator pushers; and a mechanism for moving the pushers axially relative to the insulator guide walls; the improvement wherein: at least one of the pushers is an elongate aluminum member having at least the leading end thereof anodized, and also having the anodized portion impregnated with a lubricant material, whereby reduced wear of the at least one pusher will occur during operation of the apparatus and whereby removal of the at least one pusher from the apparatus is facilitated in the event that an insulator slips between the leading end of the at least one pusher and an insulator guide wall.

2. The apparatus of claim 1 wherein the lubricant material is a fluorocarbon material.

3. The apparatus of claim 1 wherein the trailing end of the at least one pusher interfits with the mechanism for moving the pushers.

4. The apparatus of claim 1 wherein the trailing end of the at least one pusher has a notch formed therein and wherein the leading end of the same pusher has a relief groove formed therein.

* * * * *